May 25, 1954  N. ROSENLUND  2,679,171
SAW SHARPENING DEVICE

Filed Dec. 13, 1951  2 Sheets-Sheet 1

INVENTOR.
NILS ROSENLUND

BY

ATTORNEY

May 25, 1954 — N. ROSENLUND — 2,679,171
SAW SHARPENING DEVICE
Filed Dec. 13, 1951 — 2 Sheets-Sheet 2
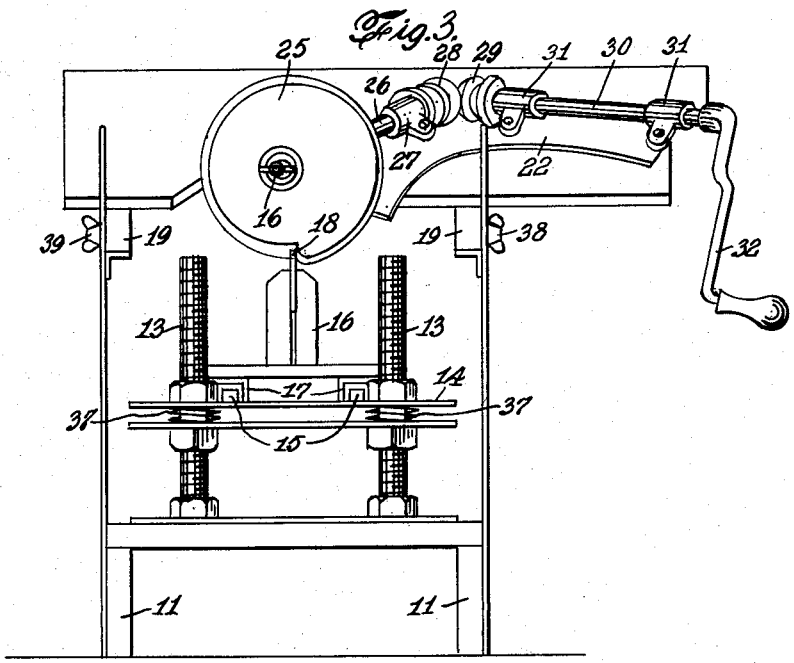
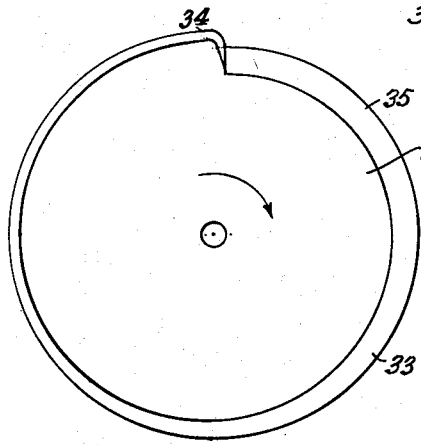
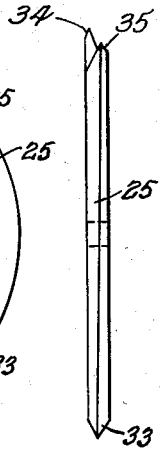
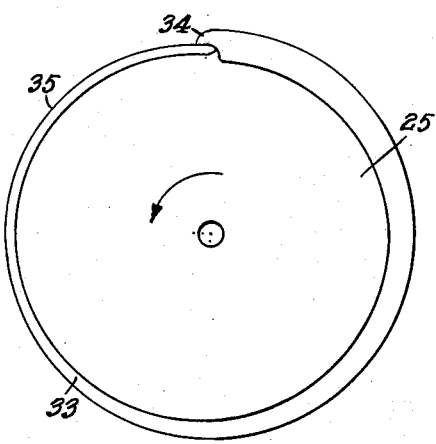
INVENTOR.
NILS ROSENLUND
BY
ATTORNEY

Patented May 25, 1954

2,679,171

UNITED STATES PATENT OFFICE 2,679,171

SAW SHARPENING DEVICE

Nils Rosenlund, Brooklyn, N. Y.

Application December 13, 1951, Serial No. 261,444

2 Claims. (Cl. 76—38)

This invention relates to new and useful improvements in apparatus and means for the sharpening of saws, especially wood saws, and it has for its purpose to provide a device whereby saws of different lengths may be conveniently sharpened.

The device will readily lend itself to adjusting the grinding wheels for different depths of teeth and any angles of the same.

The device is of sturdy and durable construction, and may be made at a comparatively low cost.

With the above and other objects in view, this invention consists of the novel features of construction, combination and arrangement of parts, hereinafter fully described, claimed and illustrated in the accompanying drawings, forming part of this application, and in which similar characters of reference indicate corresponding parts in all views, and in which:

Figure 3 is an end view looking from the right side in Figure 1.

Figure 4 is a front view of a grinding wheel.

Figure 5 is an end view of the same; while Figure 6 is a rear view thereof.

Figure 7 is a detail modification.

Figure 1:
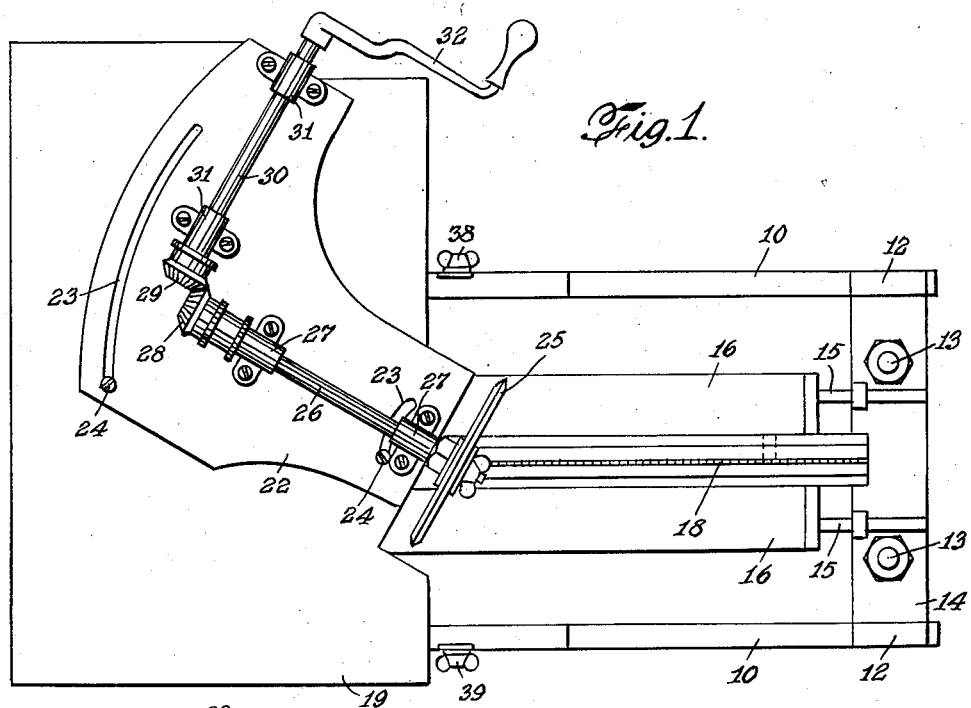
Figure 1 is a top plan view of my invention.

Referring more particularly to the drawings, the numeral 10 indicates side bars supported upon legs 11; bars 12 are attached to the latter and support bolts 13. Adjustable plates 14 are mounted upon said bolts, and said plates, in turn, carry two bars 15; a carriage 16 in the form of a clamp or holder is mounted upon the bars 15 by means of sliding members 17.

The carriage 16 supports the saw 18 to be sharpened. An adjustable table 19 is pivotally secured to standards 20, as at 21; said table has mounted thereon a plate 22 provided with slots 23 and screws 24 whereby angular adjustment may be made of a grinding wheel 25 held on a shaft 26 supported in pillow blocks 27, which latter are mounted on the plate 22. The said shaft is provided with a miter gear 28, which, in turn, meshes with a miter gear 29 mounted on a shaft 30, the latter is supported in pillow blocks 31 mounted on the plate 22. The shaft 30 is at its end provided with a crank 32 for the operation, by means of the construction thus set forth, of the grinding wheel 25.

The said grinding wheel 25, shown in detail in Figures 4 to 6, is provided with an eccentric cutting face 33; this eccentric cutting face, or edge 33, is made to cause the saw 18 and clamp 16, riding on the bars 15, to advance automatically upon each revolution, due to the fact that the grinding edge 34 projects beyond the grinding edge 35 of the grinding wheel.

Figure 2:
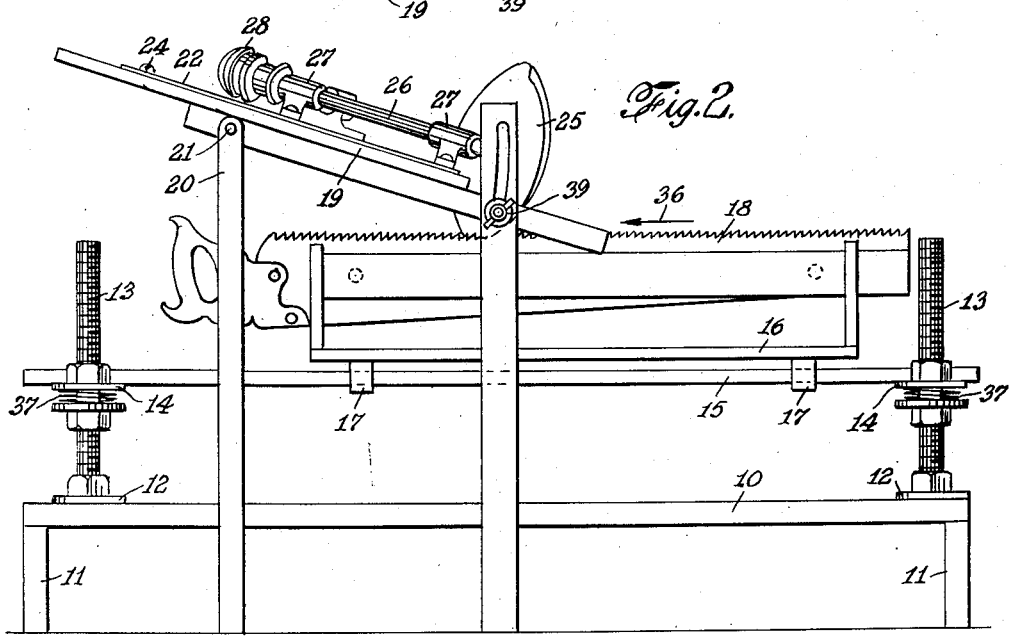
Figure 2 is a side elevational view of the same.

Upon each rotation of the grinding wheel 25, the leading edge 34 of the latter will enter between two teeth of the saw 18 and will, due to its angular adjustment, feed the saw in a direction of the arrow 36 in Figure 2.

The plates 14 are yieldingly supported upon the bolts 13 by expansion springs 37, in order to compensate during the grinding process for any special form and quality of the saw.

It is obvious that changes may be made in the form, construction and arrangement of the several parts, as shown, within the scope of the appended claims, without departing from the invention, and I do not, therefore, wish to limit myself to the exact construction shown and described herein.

What I claim as new, and desire to secure by Letters Patent of the United States, is:

1. A device of the class described comprising, in combination, legs, side bars supported by the latter, transverse bars arranged upon said side bars, and bolts mounted upon the transverse bars, transversely disposed adjustable plates mounted upon said bolts, and springs arranged upon the latter for yieldingly supporting said plates, longitudinal members arranged upon said plates, a carriage adapted to slide upon said longitudinal members, and a saw held by said carriage, standards, an adjustable table pivotally secured to the latter, a plate mounted on said table and being formed with a slot therein, and a screw, whereby angular adjustment may be made of said plate, a shaft, a grinding wheel mounted upon the latter and adapted to grind said saw, said shaft being secured to said adjustable plate, and a second shaft adapted to rotate said first shaft in turning a grinding wheel for the sharpening of the saw.

2. In a device, as claimed in claim 1, and wherein the grinding wheel is provided with an eccentric cutting face.

References Cited in the file of this patent

UNITED STATES PATENTS

| Number | Name | Date |
|---|---|---|
| 116,189 | Beyer | June 20, 1871 |
| 139,304 | Duffy | May 27, 1873 |
| 489,275 | Twyford | Jan. 3, 1893 |
| 1,096,689 | Dekle | May 12, 1914 |
| 1,130,112 | Schmidt | Mar. 2, 1915 |
| 1,209,166 | Kawahara | Dec. 19, 1916 |
| 1,406,512 | Westerdahl | Feb. 14, 1922 |
| 1,561,231 | Hatz | Nov. 10, 1925 |